US006835927B2

(12) United States Patent
Becker et al.

(10) Patent No.: US 6,835,927 B2
(45) Date of Patent: Dec. 28, 2004

(54) MASS SPECTROMETRIC QUANTIFICATION OF CHEMICAL MIXTURE COMPONENTS

(75) Inventors: Christopher H. Becker, Palo Alto, CA (US); Curtis A. Hastings, Arlington, VA (US); Scott M. Norton, Sunnyvale, CA (US)

(73) Assignee: Surromed, Inc., Menlo Park, CA (US)

( * ) Notice: Subject to any disclaimer, the term of this patent is extended or adjusted under 35 U.S.C. 154(b) by 0 days.

(21) Appl. No.: 10/272,425

(22) Filed: Oct. 15, 2002

(65) Prior Publication Data

US 2003/0111596 A1 Jun. 19, 2003

Related U.S. Application Data

(60) Provisional application No. 60/329,631, filed on Oct. 15, 2001.

(51) Int. Cl.[7] .......................... B01D 59/44; H01J 49/00

(52) U.S. Cl. ........................ 250/282; 250/281; 250/288

(58) Field of Search ................................ 250/281, 282, 250/288; 356/432; 435/7.1

(56) References Cited

U.S. PATENT DOCUMENTS

| | | | | |
|---|---|---|---|---|
| 4,752,888 A | | 6/1988 | Yoshihara | |
| 5,119,315 A | | 6/1992 | Kemp et al. | |
| 5,412,208 A | | 5/1995 | Covey et al. | |
| 5,592,402 A | | 1/1997 | Beebe et al. | |
| 5,672,869 A | | 9/1997 | Winding et al. | |
| 5,885,841 A | | 3/1999 | Higgs, Jr. et al. | |
| 5,995,989 A | | 11/1999 | Gdecke et al. | |
| 6,008,490 A | | 12/1999 | Kato | |
| 6,008,896 A | | 12/1999 | Sabsabi et al. | |
| 6,091,492 A | * | 7/2000 | Strickland et al. | 356/336 |
| 6,112,161 A | | 8/2000 | Dryden et al. | |
| 6,147,344 A | | 11/2000 | Annis et al. | |
| 6,207,955 B1 | | 3/2001 | Wells et al. | |
| 6,253,162 B1 | | 6/2001 | Jarman et al. | |
| 6,278,794 B1 | | 8/2001 | Parekh et al. | |
| 6,391,649 B1 | * | 5/2002 | Chait et al. | 436/173 |
| 6,421,612 B1 | | 7/2002 | Agrafiotis et al. | |
| 6,449,584 B1 | | 9/2002 | Bertrand et al. | |
| 6,526,299 B2 | * | 2/2003 | Pickard | 600/310 |
| 6,642,059 B2 | * | 11/2003 | Chait et al. | 436/173 |
| 6,753,966 B2 | * | 6/2004 | Von Rosenberg | 356/432 |
| 2001/0019829 A1 | * | 9/2001 | Nelson et al. | 435/7.1 |
| 2002/0053545 A1 | | 5/2002 | Greef | |

FOREIGN PATENT DOCUMENTS

| | | |
|---|---|---|
| EP | 0969283 | 1/2000 |
| WO | WO 98/16661 | 4/1998 |
| WO | WO 00/67017 | 11/2000 |
| WO | WO 01/35266 | 5/2001 |

OTHER PUBLICATIONS

Bryant et al.(2001) Rapid Comm. In Mass Spectometry 15: 418–427.

(List continued on next page.)

*Primary Examiner*—Frank G. Font
*Assistant Examiner*—Mary El-Shammaa
(74) *Attorney, Agent, or Firm*—Swanson & Bratschun, LLC

(57) ABSTRACT

Relative quantitative information about components of chemical or biological samples can be obtained from mass spectra by normalizing the spectra to yield peak intensity values that accurately reflect concentrations of the responsible species. A normalization factor is computed from peak intensities of those inherent components whose concentration remains constant across a series of samples. Relative concentrations of a component occurring in different samples can be estimated from the normalized peak intensities. Unlike conventional methods, internal standards or additional reagents are not required. The methods are particularly useful for differential phenotyping in proteomics and metabolomics research, in which molecules varying in concentration across samples are identified. These identified species may serve as biological markers for disease or response to therapy.

51 Claims, 9 Drawing Sheets

OTHER PUBLICATIONS

Chelius et al. (2002) J. Proteome Res. 1: 317–323.
Fiehn et al. (2000) Nat. Biotechnol. 18: 1157–1161.
Gygi et al. (1999) Nat. Biotechnol. 17: 994–999.
Schoonhans et al. (2000) J. Pharmaceutical and Biomedical Anal. 21: 1197–1214.
do Lago et al. (1995) Anal. Chim. Acta, 310: 281–288.
Windig et al. (1996) Anal. Chem., 68: 3602–3606.
Chace (2001) Chem. Rev. 101: 445–477.
Breen, et al. (2000) Electrophoresis 21:2243–2251.
Koradi et al. (1998) J. Mag. Res. 135:288–297.
Stein (1999) J. Am. Soc. Mass Spectrom. 10:770–81.
Wang et al. (Feb. 15, 1987) Analytical Chemistry.
Nielsen et al. (1998) J. of Chromatography A.
Bylund et al. (2002) J. of Chromatography 961:237–244.
Pravdova et al. (2002) Analytica Chimica Acta 456:77–92.
Kassidas et al. (1998) AIChE Journal 44(4):864–875.
Grung & Kvalheim (1995) Analytica Chimica Acta 304:57–66.
Prazen et al. (Jan. 15, 1998) Anal. Chem. 70:218–225.
Sakoe & Chiba (1978) IEEE Transactions on Acoustics, Speech and Signal Processing ASSP–26(1):43.
Aach & Church (2001) Bioinformatics 17(6):495–508.
Cagney et al. (2002) Nat. Biotech. 20:163.
Oda et al. (1999) Proc. Natl. Acad. Sci. USA 96:6591
Pinajian et al. (1953) J. Am. Phar. Assoc. 42:30.
Caprioli et al. (1972) Biochem. Appl. Mass Spectrom. 27:735.
Wang et al. (2003) Anal. Chem. 75:4818.
Nelson et al. (1995) Anal. Chem. 67:1153.
Bucknall et al. (2002) J. Am. Soc. Mass Spectrom. 13:1015.
Hamberg et al. (1973) Anal. Biochem. 55:368.
Ji et al. (2000) J Chromat. B 745:197.

* cited by examiner

MASS SPECTROMETRIC QUANTIFICATION OF CHEMICAL MIXTURE COMPONENTS

CROSS-REFERENCE TO RELATED APPLICATION

This application claims the benefit of U.S. Provisional Application No. 60/329,631, "Mass Spectrometric Quantification of Chemical Mixture Components," filed Oct. 15, 2001, incorporated herein by reference.

FIELD OF THE INVENTION

The present invention relates generally to spectroscopic analysis of chemical and biological mixtures. More particularly, it relates to a method for relative quantification of proteins or other components in mixtures analyzed by mass spectrometry without using an internal standard, isotope label, or other chemical calibrant.

BACKGROUND OF THE INVENTION

With the completion of the sequencing of the human genome, it has become apparent that genetic information is incapable of providing a comprehensive characterization of the biochemical and cellular functioning of complex biological systems. As a result, the focus of much molecular biological research is shifting toward proteomics and metabolomics, the systematic analysis of proteins and small molecules (metabolites) in a cell, tissue, or organism. Because proteins and metabolites are far more numerous, diverse, and fragile than genes, new tools must be developed for their discovery, identification, and quantification.

One important aspect of proteomics is the identification of proteins with altered expression levels. Differences in protein and metabolite levels over time or among populations can be associated with diseased states, drug treatments, or changes in metabolism. Identified molecular species may serve as biological markers for the disease or condition in question, allowing for new methods of diagnosis and treatment to be developed. In order to discover such biological markers, it is helpful to obtain accurate measurements of relative differences in protein and metabolite levels between different sample types, a process referred to as differential phenotyping.

Conventional methods of protein analysis combine two-dimensional (2D) gel electrophoresis, for separation and quantification, with mass spectrometric identification of proteins. Typically, separation is by isoelectric focusing followed by SDS-PAGE, which separates proteins by molecular weight. After staining and separation, the mixture appears as a two-dimensional array of spots of separated proteins. Spots are excised from the gel, enzymatically digested, and subjected to mass spectrometry for identification. Quantification of the identified proteins can be performed by observing the relative intensities of the spots via image analysis of the stained gel. Alternatively, peptides can be labeled isotopically before gel separation and expression levels quantified by mass spectrometry or radiographic methods.

While 2D gels combined with mass spectrometry (MS) has been the predominant tool of proteomics research, 2D gels have a number of key drawbacks that have led to the development of alternative methods. Most importantly, they cannot be used to identify certain classes of proteins. In particular, very acidic or basic proteins, very large or small proteins, and membrane proteins are either excluded or underrepresented in 2D gel patterns. Low abundance proteins, including regulatory proteins, are rarely detected when entire cell lysates are analyzed, reflecting a limited dynamic range. These deficiencies are detrimental for quantitative proteomics, which aims to detect any protein whose expression level changes.

In applications that do not require large-scale protein analysis, protein quantification can be performed by fluorescent, chemiluminescent, or other labeling of target proteins. Labeled antibodies are combined with a sample containing the desired protein, and the resulting protein-antibody complexes are counted using the appropriate technique. Such approaches are suitable only for known proteins with available antibodies, a fraction of the total number of proteins, and are not typically used for high-throughput applications. In addition, unlike mass spectrometric analysis, antibody-protein interactions are not fully molecularly specific and can yield inaccurate counts that include similarly structured and post-translationally modified proteins.

Because it can provide detailed structural information, mass spectrometry is currently believed to be a valuable analytical tool for biochemical mixture analysis and protein identification. For example, capillary liquid chromatography combined with electrospray ionization tandem mass spectrometry has been used for large-scale protein identification without gel electrophoresis. Qualitative differences between spectra can be identified, and proteins corresponding to peaks occurring in only some of the spectra serve as candidate biological markers. These studies are not quantitative, however. In most cases, quantification in mass spectrometry requires an internal standard, a compound introduced into a sample at known concentration. Spectral peaks corresponding to sample components are compared with the internal standard peak height or area for quantification. Ideal internal standards have elution and ionization characteristics similar to those of the target compound but generate ions with different mass-to-charge ratios. For example, a common internal standard is a stable isotopically-labeled version of the target compound.

Using internal standards for complex biological mixtures is problematic. In many cases, the compounds of interest are unknown a priori, preventing appropriate internal standards from being devised. The problem is more difficult when there are many compounds of interest. In addition, biological samples are often available in very low volumes, and addition of an internal standard can dilute mixture components significantly. Low-abundance components, often the most relevant or significant ones, may be diluted to below noise levels and hence undetectable. Also, it can be difficult to judge the proper amount of internal standard to use. Thus internal standards are not widespread solutions to the problem of protein quantification.

Recently, Gygi et al. introduced a method for quantitative differential protein profiling based on isotope-coded affinity tags (ICAT™) [S. P. Gygi et al., "Quantitative analysis of complex protein mixtures using isotope-coded affinity tags," *Nat. Biotechnol.* 1999, 17: 994–999]. In this method, two samples containing (presumably) the same proteins at different concentrations are compared by incorporating a tag with a different isotope into each sample. In particular, cysteines are alkylated with either a heavy (deuterated) or light (undeuterated) reagent. The two samples, each containing a different isotope tag, are combined and proteolytically digested, and the combined mixture is subjected to mass spectrometric analysis. The ratio of intensities of the lower and upper mass components for identical peptides provides an accurate measure of the relative abundance of the proteins in the original samples. The initial study reported mean differences between observed and expected ratios of proteins in the two samples of between 2 and 12%.

The ICAT™ technique has proven useful for many applications but has a number of drawbacks. First, the isotope tag is a relatively high-molecular-weight addition to the sample peptides, possibly complicating database searches for structural identification. The added chemical reaction and purification steps lead to sample loss and sometimes degraded tandem mass spectral fragmentation spectra. Additionally, proteins that do not contain cysteine cannot be tagged and identified. In order to obtain accurate relative quantification using ICAT, different samples must be processed identically and then combined prior to mass spectrometric analysis, and it is therefore impractical to compare samples acquired and processed at different times, or to compare unique samples. Furthermore, the method is not applicable to other molecular classes such as metabolites.

Existing protein and metabolite quantification techniques, therefore, require some type of chemical calibrant, increasing the sample handling steps and limiting the nature and number of samples to be compared. It would be beneficial to provide a method for quantification of proteins and low molecular weight components of chemical and biological mixtures that did not require an internal standard or other chemical calibrant.

SUMMARY OF EMBODIMENTS OF THE INVENTION

Various embodiments of the present invention provide methods for estimation of relative concentrations of chemical sample components by mass spectrometry without the use of an internal standard.

In one embodiment, the present invention provides a method for processing spectral data containing peaks having peak intensities. A set of spectra is obtained from a plurality of chemical samples such as biological samples containing metabolites, proteins or peptides. The spectra can be mass spectra obtained by, for example, electrospray ionization (ESI), matrix-assisted laser desorption ionization (MALDI), or electron-impact ionization (EI). Peak intensities in each spectrum are scaled by a normalization factor to yield peak intensities that are proportional to the concentration of the responsible component. Based on scaled peak intensities, relative concentrations of a particular sample component can be estimated. The normalization factor is computed in dependence on chemical sample components whose concentrations are substantially constant in the chemical samples. In one embodiment, these components are not predetermined and are inherent components of the chemical samples. In another embodiment, the normalization factor is computed from ratios of peak intensities between two (e.g., first and second) spectra of the set and is a non-parametric measure of peak intensities such as a median.

In an alternative embodiment, the present invention provides a method for estimating relative concentrations of a particular component in at least two chemical samples, such as biological samples containing proteins or peptides. Mass spectra are acquired, e.g., by electrospray ionization, matrix-assisted laser desorption ionization, or electron-impact ionization of the samples, and peak intensities of peaks in the spectra are scaled by a normalization factor. The normalization factor is computed in dependence on chemical sample components whose concentrations are substantially constant in the chemical samples. In one embodiment, it is computed from ratios of peak intensities in two (e.g., first and second) of the spectra and is a non-parametric measure (e.g., median) of peak intensities. Based on scaled peak intensities of a peak corresponding to the particular component, relative concentrations of the particular component can be estimated.

Additionally, the present invention provides a method for detecting a component present in substantially different concentrations in at least two chemical samples, such as biological samples containing proteins or peptides. Mass spectra of the samples are obtained, e.g., using electrospray ionization, matrix-assisted laser desorption ionization, or electron-impact ionization. Peak intensities in each spectrum are scaled by a normalization factor computed in dependence on chemical sample components whose concentrations are substantially constant in the chemical samples. In one embodiment, the normalization factor is computed from ratios of peak intensities in two (e.g., first and second) of the spectra and is a non-parametric measure (e.g., median) of peak intensities. A peak is then identified that has substantially different scaled peak intensities in at least two of the mass spectra. In an additional embodiment, the component corresponding to the peak is identified. A relative concentration of the component in the samples can be computed based on the scaled peak intensities of the corresponding peak.

Another embodiment of the present invention is a program storage device accessible by a processor and tangibly embodying a program of instructions executable by the processor to perform method steps for the above-described methods. An additional embodiment is a computer readable medium storing a plurality of normalized peak intensities obtained by any of the methods described above.

DETAILED DESCRIPTION OF EMBODIMENTS OF THE INVENTION

Figure 1A:
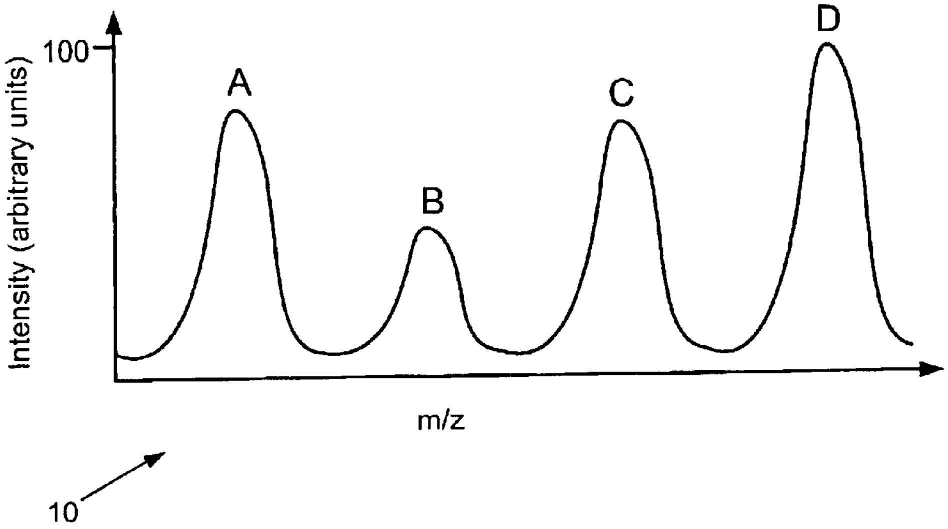
FIGS. 1A–1B are schematic mass spectra of two mixtures in which the concentration of one component varies.

Various embodiments of the present invention provide methods for relative quantification of a substance present at different concentrations in different chemical samples using mass spectrometry. Unlike many prior art mass spectrometric quantification methods, which require internal standards or detectable tags to be added to each sample, or which require multiple samples to be combined for analysis, embodiments of the present invention allow relative quantification to be performed directly from acquired mass spectra. In some embodiments, no additional sample processing steps are required, and quantification can be performed on previously acquired data that were not intended to be compared. The methods can be useful for small sample volumes that would be overwhelmingly diluted by an internal standard. They are also useful for samples that contain multiple components of interest or of which the components of interest can be determined only after measurements are performed (unanticipated components).

Although embodiments of different methods will be described primarily in the context of mass spectrometry, it is to be understood that the methods are applicable to any type of spectroscopy or spectrometry yielding spectra containing signals (or peaks) whose intensities or areas are proportional to component concentrations. Mass spectrometry is believed to be an important tool for proteomics and metabolomics research, because it provides for sensitive detection and identification of all types of proteins and metabolites over a large dynamic range. However, the detected ion intensity may depend upon many factors in addition to sample component concentration, such as ionization efficiency, detector efficiency, sample size, and sample flow rate. For this reason, additional methods are traditionally employed to provide for quantification of detected components. While protein and peptide ionization for mass spectrometry conventionally employ MALDI (matrix-assisted laser desorption ionization) or ESI (electrospray ionization), the invention is applicable to any suitable current or future ionization method, as well as any suitable detection method, such as ion trap, time-of-flight, or quadrupole analyzers. In addition, the method can be applied to data obtained from gas chromatography-mass spectrometry (GC-MS), particularly using electron-impact ionization (EI), a highly reproducible ionization method. One application of embodiments of the invention is analysis of mixtures of metabolites and proteins that are enzymatically digested prior to analysis; other embodiments are used for relative quantification of any type of chemical or biological sample.

Some embodiments of the invention rely on the assumption that biological samples, particularly those of interest in proteomics and metabolomics research, consist of complex mixtures of multiple biological components, of which only a minority are relevant or important. The large majority of components are at relatively constant concentrations across samples and subject populations. For the purposes of discovering biological markers of disease, these constant components provide little useful information. Rather, it is the difference in protein expression between, for example, healthy and diseased subjects, that is important. Differentially expressed proteins (or other organic molecules) may serve as biological markers that can be measured for diagnostic or therapeutic purposes. In embodiments of the present invention, the majority of components whose concentrations do not vary across samples are used to normalize the concentrations of components that do vary. Thus this background level of substantially unchanging proteins serves as an intrinsic internal standard by which the relative concentrations of varying proteins can be measured. This intrinsic internal standard can be used to correct for both drift in instrument response and also overall differences in sample concentrations (e.g., dilute versus concentrated urine). Note that high accuracy of relative quantification depends in part on consistent sample processing techniques.

Figure 1B:
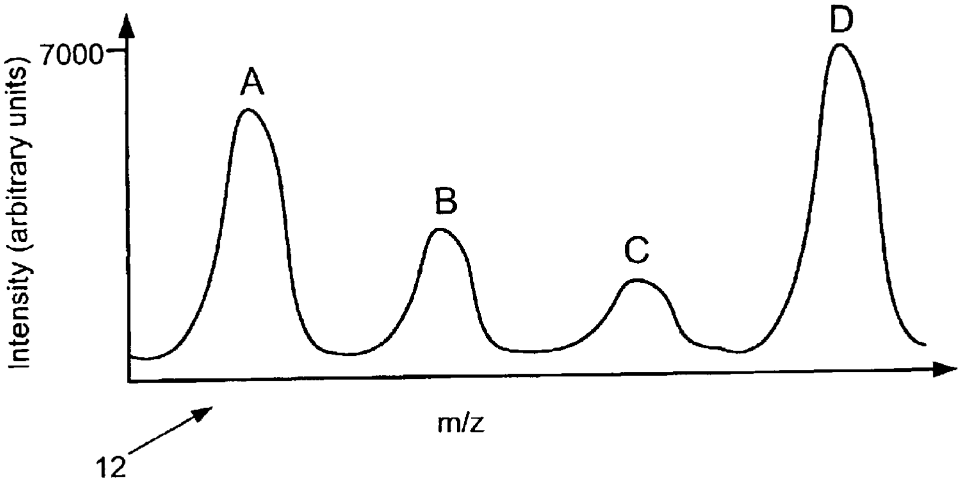

One embodiment of the invention is a method illustrated by the schematic mass spectra 10 and 12 of FIGS. 1A and 1B. A single mass spectrum plots intensity values as a function of mass-to-charge ratio (m/z) of detected ions. In addition, a third dimension (not shown), spatial or temporal position, may also be present. Typical position variables include chromatographic retention time, sample array number, or well position. A mass spectrum can be generated for a series of position values, or, alternatively, the data can be considered to be three dimensional, with intensity values at each value of position and mass-to-charge ratio. In these cases, the substantially constant pattern can be detected in the three-dimensional data set, in the individual mass spectra, or in plots of intensity versus position (e.g., for retention time as the position variable, mass chromatograms).

The spectra 10 and 12 shown correspond to two different samples, both of which yield component peaks at particular values of mass-to-charge ratio (m/z), labeled as A, B, C, and D. As used herein, a peak is a local maximum in signal intensity, with respect to one or more of m/z, chromatographic retention time, or any other suitable variable. Peaks are characterized by the value of the variables at which they occur. The intensity value (height, area under the curve, or other suitable intensity measure) of the peak is referred to as its peak intensity. Note that the two spectra have completely different intensity scales. In the spectrum 10 of FIG. 1A, the maximum intensity is below 100, while in the spectrum 12 of FIG. 1B, the maximum intensity approaches 7000. These intensity values are in arbitrary units, with absolute values depending upon a number of factors, such as detector settings and volume of liquid injected, that are independent of the concentrations within the sample.

Although the absolute intensity values vary widely between the two spectra, the relative abundances of components represented by peaks A, B, and D are essentially the same in the two spectra. Thus it is assumed that these three components have substantially equal or constant concentrations in the two samples. The substantial constancy of concentrations is represented as the substantial constancy of intensity ratios. That is, the ratio of intensities of peaks A and B, A and D, and B and D are substantially constant. Equivalently, the ratio between each component in the two spectra is substantially constant. That is, the ratio of peak A intensity in the second spectrum 12 to peak A intensity in the first spectrum 10 is approximately equal to the ratio of peak B intensity in the second spectrum 12 to peak B intensity in the first spectrum 10. These ratios are approximately 70:1. As used herein, a substantially constant concentration or substantially constant ratio refers to one that fluctuates by no more than a value approximately equal to the coefficient of variation (CV) for peak intensities in spectra of similar types of samples. For serum sample spectra obtained using currently optimal sample preparation techniques and current instruments, a current value is approximately 25%. As will be appreciated by those of skill in the art, numerous error sources exist for LC-MS and GC-MS data, including the sample preparation techniques, chromatographic method, and ionization method. While lower coefficients of variation may be achieved when measuring limited numbers of molecules in relatively simple samples, it is not expected that similar numbers can be obtained for simultaneous measurement of thousands of molecules in complex biological samples. This value may decrease with future improvements in sample preparation methods and instrumentation.

In contrast, the component represented by peak C varies in relation to the other peaks. Any of the ratios between C and A, C and B, and C and D are substantially non-constant between the two spectra, changing by more than the approximate CV, preferably more than about 25%. The ratio of peak C intensity in the second spectrum 12 to peak C intensity in the first spectrum 10 is approximately 70:3, substantially different from the 70:1 ratio for all other peaks. Since this ratio changes by a factor of three, it can be assumed that the concentration of a chemical component associated with peak C is three times greater in the sample of the first spectrum 10 than in the sample of the second spectrum 12.

The structure of the component associated with peak C can be determined subsequently. In some cases, the peptide or other molecule corresponding to the mass-to-charge ratio of peak C is known. In other cases, tandem mass spectrometry can be performed to fragment the ion of peak C and obtain its mass spectrum, from which the structure of the ion can be determined. Typically, a protein-containing sample is enzymatically digested before mass spectral analysis, and there are multiple peptide peaks varying according to the same ratio. In many cases, the peak list can be compared with spectral libraries to determine the identity of the varying component. Other analysis can be included to account for multiply charged ions or modifications, such as oxidation, to a portion of the peptides. Also, accurate mass measurements can be employed to aid in molecular identification.

Figure 2:
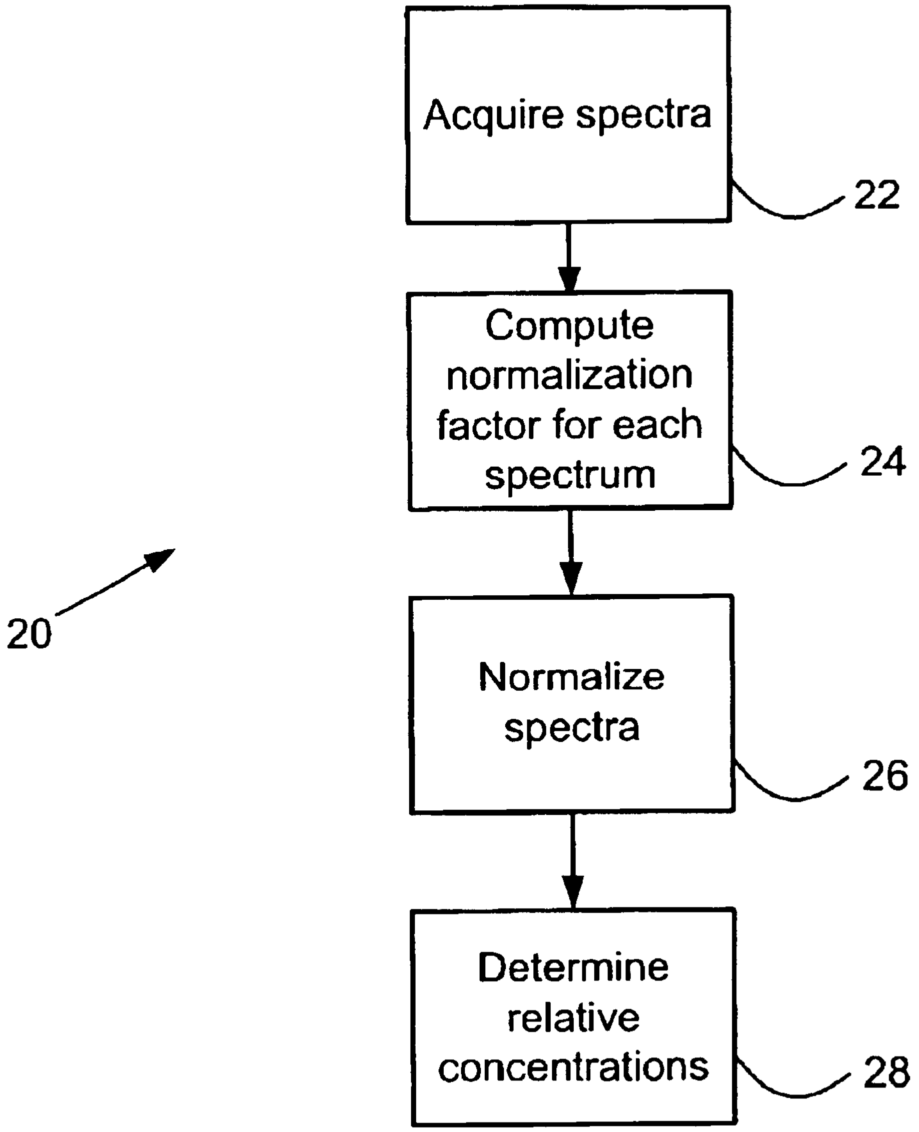
FIG. 2 is a flow diagram of a chemical sample component quantification method according to one embodiment of the present invention.

A flow diagram outlining general steps of a method 20 of one embodiment of the present invention is shown in FIG. 2. In the first step 22, a set containing at least two spectra, and preferably more, possibly including replicate spectra of the same sample, are acquired. The spectra can be two-dimensional plots of intensity versus mass-to-charge ratio, or they can be higher dimensional plots, such as plots of intensity at mass-to-charge ratio and retention time, for hyphenated techniques such as liquid chromatography-mass spectrometry. The spectra can be processed if desired. For example, peaks can be selected in each spectrum by, for example, applying a noise threshold. The description of spectral processing below applies to any format in which the spectrum is represented, e.g., as a list of identified peaks.

In a second step 24, a normalization factor is computed for each spectrum (or a subset of the spectra) in the set. The normalization factor is computed in dependence on chemical sample components whose concentrations are substantially constant among the analyzed chemical samples. The constant components are represented by peaks whose intensity ratios remain substantially constant across spectra, as described above. Typically, it is not known a priori which components will be at constant concentration; that is, the constant components are not predetermined. In fact, it is often the object of the study to determine which components do vary among samples. The constant components are not added to the samples for quantification purposes; rather, they are inherent components of the samples being analyzed.

Figure 3:
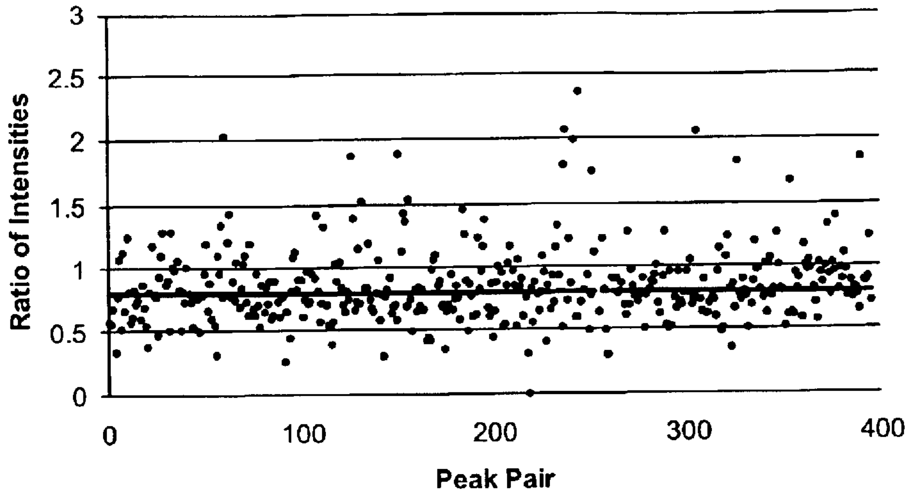
FIG. 3 is a plot of intensity ratios used to compute a normalization factor in an additional embodiment of the method of FIG. 2.

In one embodiment, one of the spectra is selected as a reference spectrum, and ratios are computed between peaks in the spectrum to be normalized (the test spectrum) and the reference spectrum. Ratios can be computed for all peaks or for some fraction of the total number of peaks. The reference spectrum can be of the same general type of sample (e.g., same biological fluid such as serum) but is not otherwise closely matched. Peak ratios are computed for peaks at the same value of m/z (and retention time or other position variable, for hyphenated methods), within predefined tolerances, resulting in a list of ratios. The majority of values in the list are substantially equal, representing components whose concentrations do not vary between the test and reference spectra. In one embodiment, the normalization factor is computed from the list of ratios using a non-parametric measure. Most preferably, the normalization factor is the median of the list of intensity ratios. Alternatively, the normalization factor can be the mode of the list of intensity ratios. Non-parametric measures such as a median or mode are insensitive to outliers and therefore minimize the effect of non-constant components on the normalization factor. An example of a normalization factor obtained from the median of the ratios of peaks in two peptide samples derived from human serum is shown in FIG. 3. The plot shows the ratio for each of approximately 400 m/z and retention time pairs (points), as well as the computed normalization factor (straight line) at 0.80.

In an alternative embodiment, if constant components are known a priori, then intensities of peaks corresponding to these components can be used as the normalization factor, or can be used to compute the normalization factor.

In the next step 26, normalized spectra are computed by scaling each peak, or each desired peak, by the normalization factor. If the normalization factor is the median of intensity ratios of the reference to test spectra, then the peaks are multiplied by this factor.

Any desired quantitative analysis can be performed on the normalized spectra. For example, in step 28, peaks are located whose intensity varies substantially between at least two spectra. Substantially varying peaks differ by at least the approximate CV, e.g., by at least 25%. The intensity ratio of two such peaks occurring within a specified m/z and position tolerance indicates the relative concentrations of the component responsible for the peak in the two samples. Subsequent analysis may be performed using conventional methods to determine the identity of the compound or compounds responsible for the peak differences. In proteomic analysis, a single protein is digested into multiple peptide fragments, yielding multiple peaks. Conventional algorithms and public databases can be employed to identify the responsible protein.

While it may be possible to determine manually or using a simple automated algorithm which peaks of the normalized spectra vary, more complex methods may also be used. For example, in one embodiment of the invention, an analysis algorithm can be applied to the normalized spectra to determine which peaks are most responsible for the variance among spectra. One possible algorithm is principal component analysis (PCA), but other techniques including, but not limited to, ordinary least squares, principal component regression, and partial least squares can also be used. PCA is known in the art and will not be described in detail herein. Briefly, PCA reduces the dimensionality of the spectral data by introducing new variables, termed principal components, that are linear combinations of the original variables. Originally, each spectrum is represented as a vector of normalized intensity values at each relevant mass-to-charge (m/z) ratio or m/z and retention time pair. The first principal component accounts for as much of the variance in the data as possible, and each succeeding component accounts for as much of the remaining variance as possible.

In many cases, enough information is contained in the first two or three principal components for the Euclidean distances between points in principal component space to indicate the similarity between spectra.

To determine which peaks differ most in intensity among samples, it is useful to determine which peaks contribute most to each principal component. This can be accomplished by examining the coefficients in the linear combinations that make up the principal components to locate peaks with the highest absolute value of coefficient. Once the set of relevant peaks is known, ratios (between spectra) of their normalized intensities can be obtained to determine the relative quantity of the corresponding ion (and peptide or protein) in the different samples. If it is known that multiple peaks correspond to peptides obtained from the same protein, an average is computed of their ratios to determine the protein's relative quantity in the different samples. Note that when the ratio is computed from all peptide peaks originating from the same protein, each peak is an independent measure of the protein concentration, effectively lowering the measurement standard deviation.

The intensities used in obtaining the quantification ratios and performing the analyses can be computed in a number of different ways. The most suitable intensity measure typically depends upon the type of data acquired. A simple measure is the maximum intensity value of the identified peak. Alternatively, the intensity can be the peak area (or volume for three-dimensional data). It is to be understood that the term "intensity," as used herein, refers to intensity measures computed in any desired manner. The selected measure typically depends on the particular data. In many cases, equivalent results are obtained using a variety of different measures.

Note that in some embodiments of the invention, it is sufficient to know which peaks are varying among samples, and it is not necessary to quantify the relative concentrations. Normalization is useful in this case to allow accurate identification of the varying peaks.

In one embodiment, it may be desirable to add one or more spiked molecules to aid in quantification. These molecules may be matched to a known sample component (e.g., a deuterated or other isotopically-labeled version) or not matched to any components. The spiked molecules can be added to the samples at a known concentration and their signal intensities used to normalize spectral signals and computed sample component concentrations.

Figure 4:
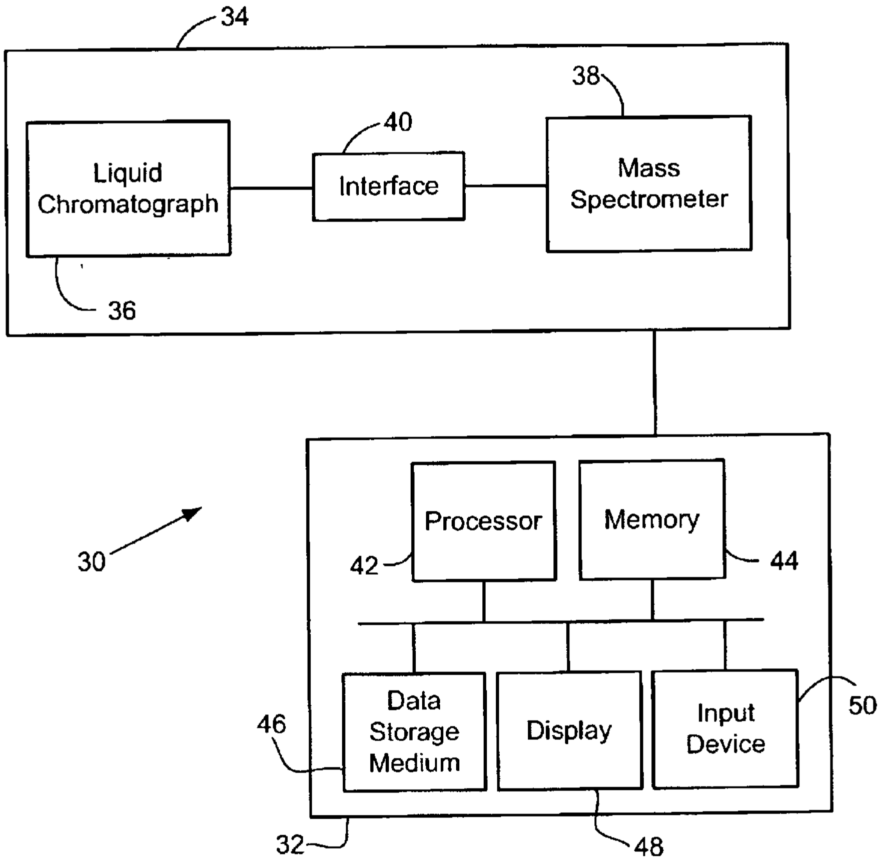
FIG. 4 is a block diagram of one embodiment of a computer system for implementing the method of FIG. 2.

Although not limited to any particular hardware configuration, the present invention can be implemented in software by a system 30 shown in FIG. 4, containing a computer 32 in communication with an analytical instrument 34, in this case a LC-MS instrument that includes a liquid chromatography instrument 36 connected to a mass spectrometer 38 by an interface 40. The computer 32 acquires raw data directly from the instrument 34 via a detector and analog-to-digital converter. Alternatively, the invention can be implemented by a computer in communication with an instrument computer that obtains the raw data. Of course, specific implementation details depend on the format of data supplied by the instrument computer. In one embodiment, the entire process is automated: the user sets the instrument parameters and injects a sample, data are acquired, and the spectra are normalized and analyzed to determine and quantify the components of interest.

The computer implementing the invention can contain a processor 42, memory 44, data storage medium 46, display 48, and input device 50 (e.g., keyboard and mouse). Methods of various embodiments of the invention are executed by the processor 42 under the direction of computer program code stored in the computer 32. Using techniques well known in the computer arts, such code is tangibly embodied within a computer program storage device accessible by the processor, e.g., within system memory 44 or on a computer readable storage medium 46 such as a hard disk or CD-ROM. The methods may be implemented by any means known in the art. For example, any number of computer programming languages, such as Java, C++, or LISP may be used. Furthermore, various programming approaches such as procedural or object oriented may be employed.

In an alternative embodiment, normalized peak intensities, e.g., computed according to any of the embodiments described above, are stored on a computer readable medium. In another embodiment, the normalized peak intensities are stored in a database.

It is to be understood that the steps described above are highly simplified versions of the actual processing performed by the computer, and that methods containing additional steps or rearrangement of the steps described are within the scope of the present invention.

The following working examples illustrate embodiments of the invention without limiting the embodiments to the particular details described.

WORKING EXAMPLES

Working Example 1

5-Component Protein Mixtures

A method of one embodiment of the invention was implemented using three five-component protein mixtures in which two of the components varied in concentration, while the remaining three were constant. Relative mass concentrations within the samples were as follows:

| Sample number | Horse myoglobin | Bovine ribo-nuclease A | Bovine serum albumin | Bovine cyto-chrome C | Human hemoglobin |
|---|---|---|---|---|---|
| 1 | 1 | 1 | 1 | 1 | 1 |
| 2 | 1 | 1 | 1 | 5 | 0.2 |
| 3 | 1 | 1 | 1 | 0.2 | 5 |

All three samples were denatured by 6 M guanidine hydrochloride, reduced by 10 mM dithiothreitol at 37° C. for 4 hours, and alkylated with 25 mM iodoacetic acid/NaOH at room temperature for 30 minutes in the dark. The denaturant and reduction-alkylation reagents were removed from the mixtures by buffer exchange against 50 mM $(NH_4)_2CO_3$ at pH 8.3 three times using 5-kDa molecular weight cut-off spin filters. Modified trypsin at 1% weight equivalence of the proteins was added to the mixtures for incubation at 37° C. for 14 hours. The same amount of trypsin was again added, and the mixtures were incubated at 37° C. for another 6 hours. Each resulting sample was divided into four aliquots.

Electrospray ionization liquid chromatography-mass spectrometry was performed on the twelve aliquots using a binary HP 110 series HPLC directly coupled to a ThermoFinnigan LCQ DECA™ ion trap mass spectrometer or MicroMass LCT™ ESI-TOF mass spectrometer equipped with a nanospray source. Fused-silica capillary columns (5 μm $C_{18}$ resin, 75 μm internal diameter×10 cm) were run at a flow rate of 300 nL/min after flow splitting. An on-line trapping cartridge allowed fast loading onto the capillary column. Gradient elution was achieved using 100% solvent A (0.1% formic acid in $H_2O$) to 40% solvent B (0.1% formic acid in acetonitrile) over 100 minutes.

Figure 5:
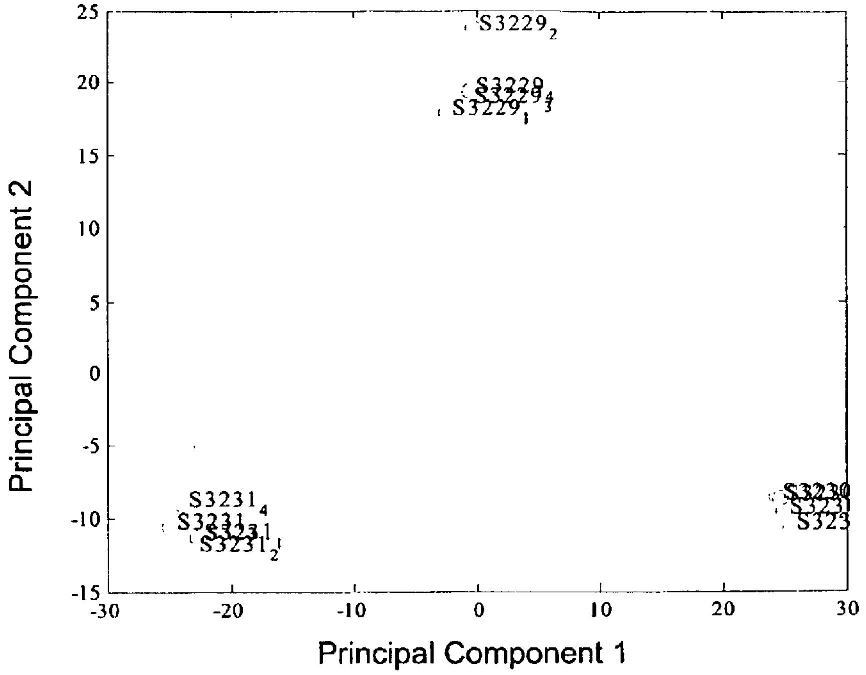
FIG. 5 is a principal component scores plot from mass spectra of four replicates each of three different five-protein mixtures.
Figure 6:
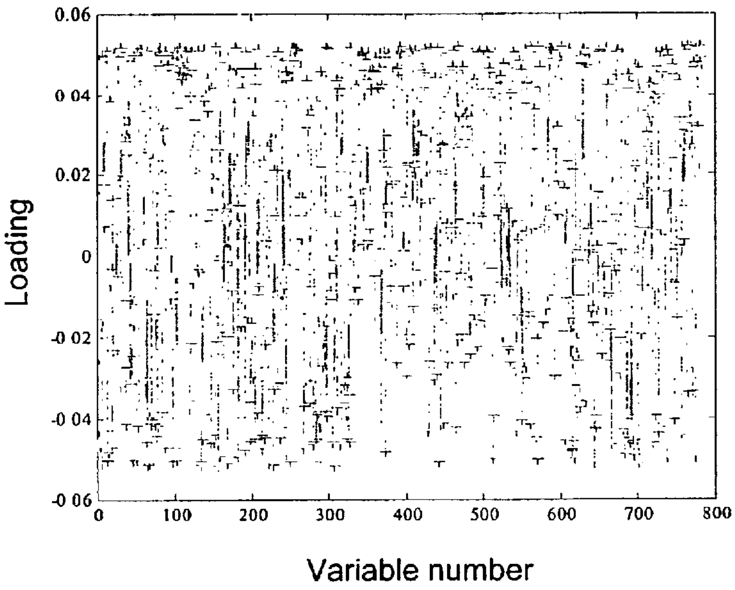
FIG. 6 is a principal component loadings plot for principal component 1 in the data of FIG. 5.

The resulting spectra were normalized using an embodiment of the normalization method in which the normalization factor was the median of intensity ratios, yielding an average coefficient of variation of 17% for the four replicates, an improvement of 5% over the non-normalized results. Principal component analysis (PCA) was performed on extracted normalized peaks, and the first and second principal components are plotted in FIG. 5 for the twelve sample aliquots. The three samples were labeled S3229, S3230, and S3231. Subscripts refer to the replicate number. It is apparent from the plot that the spectra are easily distinguished using PCA. In fact, the first principal component clearly separates samples S3230 and S3231, while the second component separates sample S3229 from samples S3230 and S3231. Peaks most responsible for the differences among the samples were determined by examining the coefficients in the linear combinations that make up the principal components. These loadings are plotted in FIG. 6, a graph of loading values in principal component 1 for each of the normalized peaks. A cutoff value of loading was selected (±0.046), and all peaks whose loading value exceeded the cutoff were retained. These peaks vary the most among samples. It was determined from the m/z values that peaks with high positive loadings corresponded to hemoglobin, while peaks at high negative loading corresponded to cytochrome C.

Figure 7:
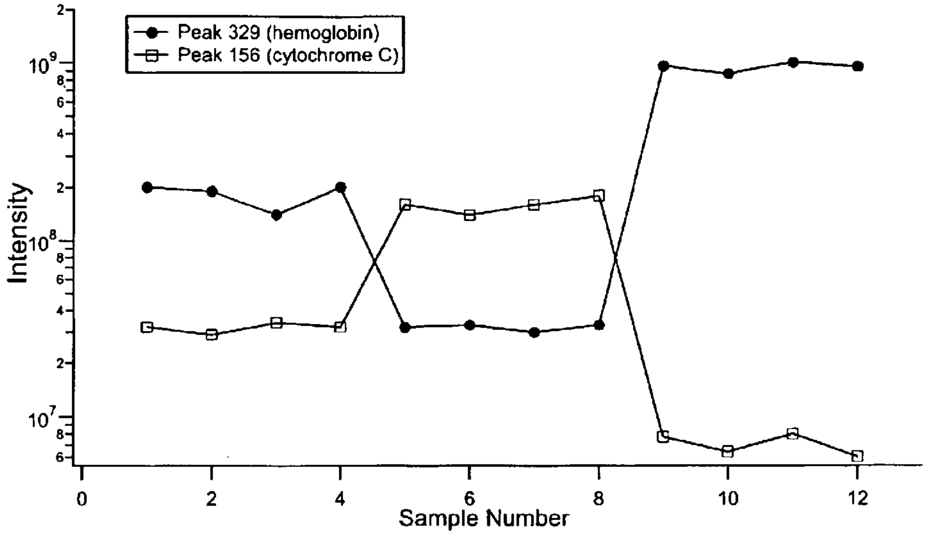
FIG. 7 is a plot of normalized intensity of peaks from hemoglobin and cytochrome C in mass spectra from the twelve samples of FIG. 5.

FIG. 7 is a plot of the logarithm of normalized intensity in each of the twelve spectra for two of the peaks, one with a high loading value in principal component 1, representing hemoglobin (m/z=513, t=43.19 minutes), and one with a large negative loading value, representing cytochrome C (ni/z=692, t=34.06 minutes). Relative concentrations of hemoglobin and cytochrome C, expected to vary as in the table above, were estimated by computing the average ratios of intensities between normalized peaks of different spectra. Results for five different hemoglobin peaks are as follows:

| | Average Ratio of Integrated Peak Areas (Theoretical value 5.0) | |
|---|---|---|
| Peak m/z | Sample 1:Sample 2 | Sample 3:Sample 1 |
| 537.01 | 5.20 | 3.85 |
| 564.60 | 3.88 | 5.36 |
| 818.74 | 5.00 | 3.45 |
| 932.77 | 5.77 | 5.51 |
| 1150.85 | 2.49 | 5.87 |
| Average ratio | 4.47 | 4.81 |
| Coefficient of variation | 29% | 23% |
| Error | 11% | 3.8% |

Differences in signal values substantially exceeding the coefficients of variation represent components occurring in different concentrations.

Working Example 2

Normalized Peak Intensities of Human Serum Sample Spectra

Human serum samples were analyzed to determine measurement variability after normalization using one embodiment of the present invention. Pooled human serum was purchased from Sigma-Aldrich (for proteome studies) and obtained from four anonymous healthy donors at the Stanford Blood Center (for metabolome studies). The serum was fractionated into serum proteome and serum metabolome using a 5-kDa molecular weight cut-off spin filter. Twenty-five μL of the serum proteome was diluted with 475 μL of 25 mM PBS buffer (pH 6.0) before being applied to affinity beads from ProMetic Life Sciences for removal of human serum albumin and IgG. The albumin- and IgG-depleted serum proteome was denatured, reduced, alkylated, and trypsin digested following the procedures described in Working Example 1 to yield 200 μg proteome. The serum metabolome was desalted using a $C_{18}$ solid-phase extraction cartridge. The proteome fraction was divided into 10 samples and the metabolome fraction into 90 samples.

Figure 8:
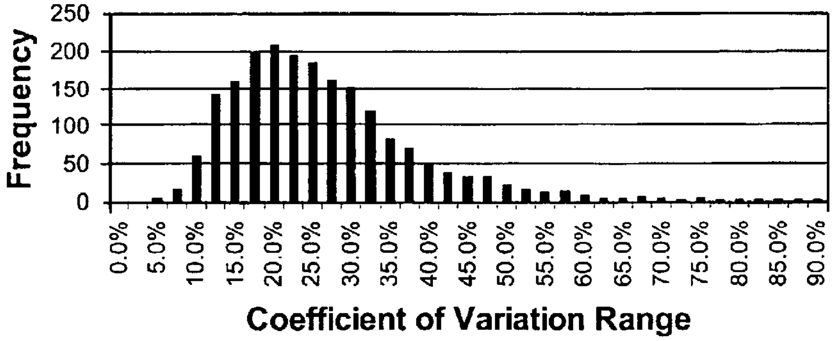
FIG. 8 is a histogram of coefficients of variation of normalized peak intensities of 2000 peaks in a human serum proteome sample.

Mass spectra were obtained of the proteome samples using the LC-MS instruments and procedures described in Working Example 1. The metabolome procedure differed in that the chromatographic separation was performed with a gradient of 10% to 25% of solvent B in 40 minutes, followed by 25–90% solvent B in 30 minutes. 2000 peaks were selected from each spectrum and normalized using the median intensity ratio as described above in one embodiment of the invention. FIG. 8 is a histogram of the coefficients of variation for peak intensity values of each peak in the serum proteome. The average CV was approximately 25%. The plot shows high reproducibility of the sample processing and normalization methods employed.

Working Example 3

Human Serum Spiked with Non-human Proteins and Small Molecules

Human blood serum proteome spiked with horse myoglobin and bovine carbonic anhydrase II, as well as human blood serum metabolome spiked with low-molecular weight species, were analyzed using methods of embodiments of the invention. The spiking is not part of the quantification method, but was rather used to test the method.

Human serum was obtained and fractionated into serum proteome and serum metabolome as described in Working Example 2. The two non-human proteins were spiked into 20 μg of unprocessed human serum proteome at amounts ranging from 100 fmol to 100 pmol. The spiked proteome samples were denatured, reduced, alkylated, and trypsin digested following the procedures described in Working Example 1. Varying amounts of an equimolar test compound mixture were added to 100 μL of the metabolome prior to sample clean-up using the solid-phase extraction $C_{18}$ cartridge. The components added were des-asp$^1$-angiotensin II, [val$^4$]-angiotensin II, vitamin $B_{12}$, and α-endorphine. Spiked mixture amounts varied from 50 fmol to 100 pmol per component. Resulting samples were analyzed by LC-MS as described in Working Example 1 and peaks identified and normalized using one embodiment of the invention.

Figure 9A:
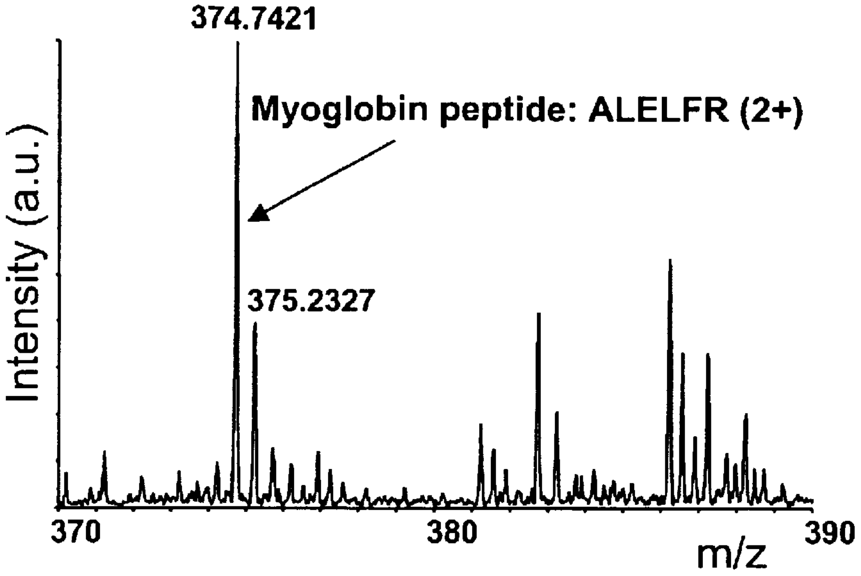
FIG. 9A is a mass spectrum of a spiked human serum proteome sample showing the location of a peak representing a horse myoglobin peptide.
Figure 9B:
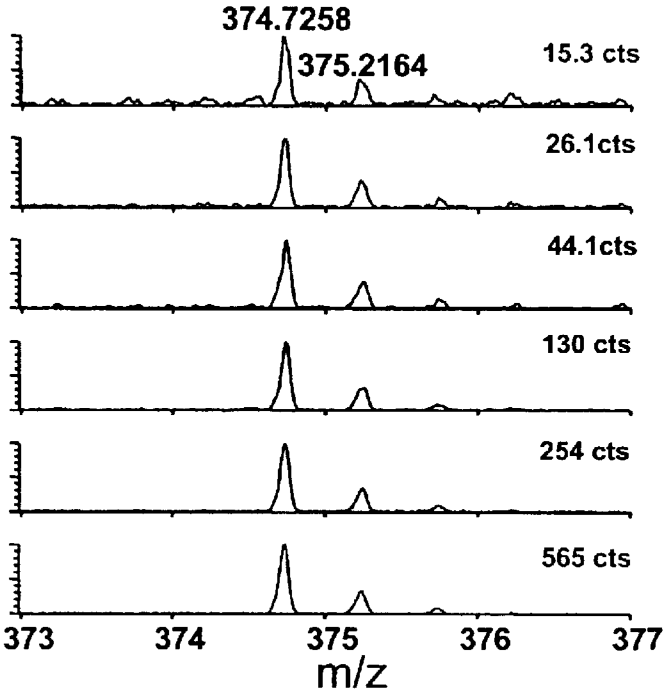
FIG. 9B shows a series of mass spectra of samples containing increasing concentrations of horse myoglobin.

FIG. 9A shows a single mass scan from an ESI-TOF experiment showing one peptide of spiked horse myoblobin co-eluting with many serum peptides. FIG. 9B shows a series of mass spectra plotted for a narrower mass range from proteome samples in which the horse myoglobin concentration was gradually increased. The intensity of the peak in counts, shown in the figure, increases linearly with the increase in myoglobin concentration. From top to bottom, the myoglobin amounts added were 250 fmol, 500 fmol, 1.0 pmol, 2.5 pmol, 5.0 pmol and 10.0 pmol.

Figure 10A:
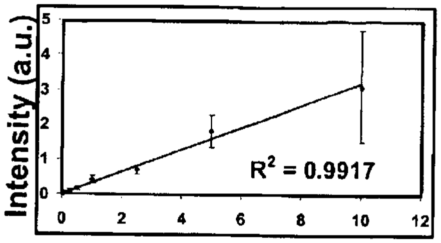
FIGS. 10A–10F are plots of normalized peak intensities of peptides from proteins spiked into human proteome samples versus concentration of the spiked component.
Figure 10B:
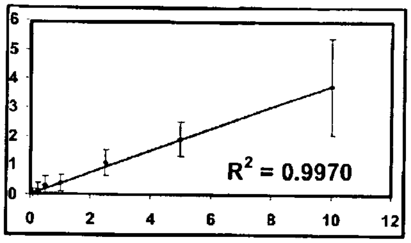
Figure 10C:
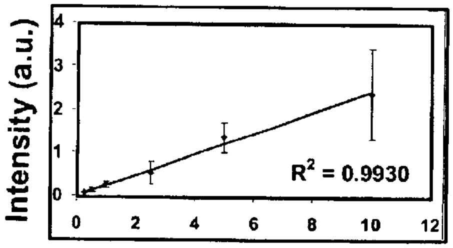
Figure 10D:
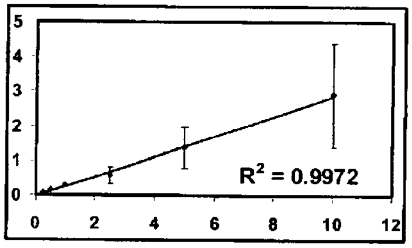
Figure 10E:
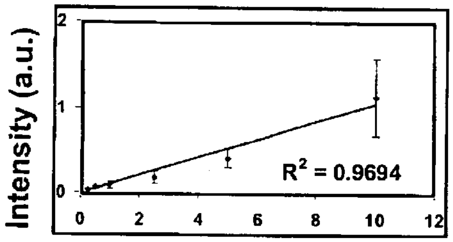
Figure 10F:
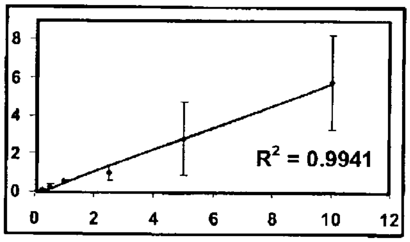

FIGS. 10A–10F are plots of normalized peak intensity of peaks from spiked proteins versus spiked protein concentration. FIGS. 10A and 10B are of two different horse myoglobin peptides, HGTVVLTALGGILK and GLSDGEWQQVLNVWGK, respectively. Spectra were obtained with the ion trap mass spectrometer. FIGS. 10C–10F show spectra obtained with the ESI-TOF mass spectrometer. FIGS. 10C and 10D are of the horse myoglobin peptides HGTVVLTALGGILK and ALELFR, respectively. FIGS. 10E and 10F are of the bovine carbonic anyhdrase peptides VLDALDSIK and AVVQDPALKPLALVYGEATSR, respectively. In all cases, points were fit with a straight line, indicating that the peak intensity values were at least approximately linearly proportional to concentration. The 100 fmol detection corresponds to an approximately 20 ppm detection limit relative to the most abundant protein, albumin.

Figures 11A, 11B, 11C:
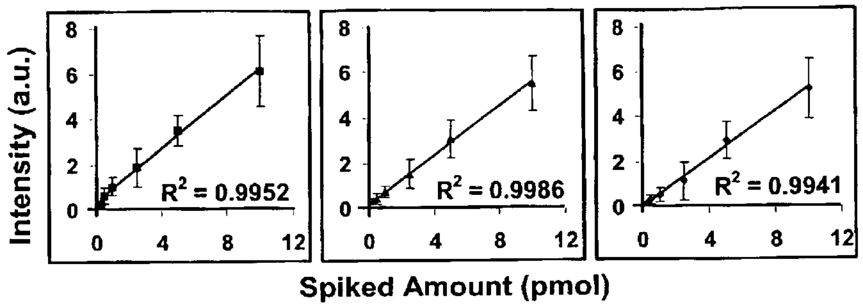
FIGS. 11A–11F are plots of normalized peak areas of compounds spiked into human metabolome samples versus concentration of the spiked component.
Figures 11D, 11E, 11F:
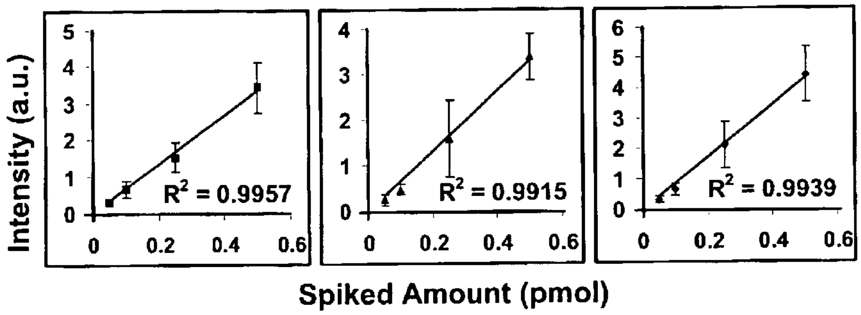

Similar results are shown for the serum metabolome in FIGS. 11A–11F. The normalized peak areas are plotted against the concentration of spiked mixture in FIGS. 11A–11F. FIGS. 11A–11C show results obtained using the ion trap MS for vitamin $B_{12}$, [val$^4$]-angiotensin, and des-asp$^1$-angiotensin, respectively. In all cases shown, a linear response was observed; the detection limit observed for α-endorphine was 1 pmol. With the higher resolution ESI-TOF (results shown in FIGS. 11D–11F for the same three compounds), lower concentrations were measurable. Assuming a detection limit of approximately 10 fmol in 100 μL of serum, or $10^{-10}$ M, an effective dynamic range of $10^8$ was obtained relative to a high-concentration molecule such as glucose, which has a concentration of approximately $10^{-2}$ M.

It should be noted that the foregoing description is only illustrative of the invention. Various alternatives and modifications can be devised by those skilled in the art without departing from the invention. Accordingly, the present invention is intended to embrace all such alternatives, modifications and variances which fall within the scope of the disclosed invention.

What is claimed is:

1. A method for processing spectral data, comprising:

a) obtaining a set of spectra from a plurality of chemical samples, each spectrum comprising peaks having peak intensities; and b) in each spectrum, scaling said peak intensities by a normalization factor computed in dependence on chemical sample components whose concentrations are substantially constant in said chemical samples.

2. The method of claim 1, wherein said chemical sample components whose concentrations are substantially constant are not predetermined.

3. The method of claim 1, wherein said chemical sample components whose concentrations are substantially constant are inherent components of said chemical samples.

4. The method of claim 1, further comprising, based on said scaled peak intensities, estimating relative concentrations in said samples of a particular sample component corresponding to a particular peak.

5. The method of claim 1, wherein said spectra are mass spectra.

6. The method of claim 5, wherein said mass spectra are produced in part by electrospray ionization of said chemical samples.

7. The method of claim 5, wherein said mass spectra are produced in part by electron-impact ionization of said chemical samples.

8. The method of claim 5, wherein said mass spectra are produced in part by matrix-assisted laser desorption/ionization of said chemical samples.

9. The method of claim 1, wherein said normalization factor is computed from ratios of peak intensities in first and second spectra in said set of spectra.

10. The method of claim 1, wherein said normalization factor is a non-parametric measure of said peak intensities.

11. The method of claim 10, wherein said normalization factor is a median of said peak intensities.

12. The method of claim 1, wherein said chemical samples are biological samples.

13. The method of claim 12, wherein said chemical sample components comprise components selected from the group consisting of metabolites, peptides and proteins.

14. The method of claim 1, wherein said method is performed without using an internal standard, isotope label or other chemical calibrant.

15. A method for estimating relative concentrations of a particular component in at least two chemical samples, comprising:

a) acquiring mass spectra of said chemical samples;

b) scaling peak intensities of peaks in said mass spectra by a normalization factor computed in dependence on chemical sample components whose concentrations are substantially constant in said chemical samples; and c) based on scaled peak intensities of a peak corresponding to said particular component, estimating relative concentrations of said particular component in said chemical samples.

16. The method of claim 15, wherein step (a) comprises performing electrospray ionization of said chemical samples.

17. The method of claim 15, wherein step (a) comprises performing electron-impact ionization of said chemical samples.

18. The method of claim 15, wherein step (a) comprises performing matrix-assisted laser desorption/ionization of said chemical samples.

19. The method of claim 15, wherein said normalization factor is computed from ratios of peak intensities in first and second mass spectra.

20. The method of claim 15, wherein said normalization factor is a non-parametric measure of said peak intensities.

21. The method of claim 20, wherein said normalization factor is a median of said peak intensities.

22. The method of claim 15, wherein said chemical samples are biological samples.

23. The method of claim 22, wherein said particular component is selected from the group consisting of a metabolite, a peptide, and a protein.

24. The method of claim 15, wherein said method is performed without using an internal standard, isotope label or other chemical calibrant.

25. A method for detecting a component present in substantially different concentrations in at least two chemical samples, comprising:

a) obtaining mass spectra of said chemical samples, each spectrum comprising peaks having peak intensities;

b) in each spectrum, scaling said peak intensities by a normalization factor computed in dependence on chemical sample components whose concentrations are substantially constant in said chemical samples; and c) identifying a particular peak having substantially different scaled peak intensities in at least two of said mass spectra, said particular peak corresponding to said component.

26. The method of claim 25, further comprising identifying said component.

27. The method of claim 25, further comprising computing a relative concentration of said component from said scaled peak intensities of said particular peak.

28. The method of claim 25, wherein step (a) comprises performing electrospray ionization of said chemical samples.

29. The method of claim 25, wherein step (a) comprises performing electron-impact ionization of said chemical samples.

30. The method of claim 25, wherein step (a) comprises performing matrix-assisted laser desorption/ionization of said chemical samples.

31. The method of claim 25, wherein said normalization factor is computed from ratios of peak intensities in first and second mass spectra.

32. The method of claim 25, wherein said normalization factor is a non-parametric measure of said peak intensities.

33. The method of claim 32, wherein said normalization factor is a median of said peak intensities.

34. The method of claim 25, wherein said chemical samples are biological samples.

35. The method of claim 34, wherein said chemical sample components are selected from the group consisting of metabolites, peptides and proteins.

36. The method of claim 25, wherein said method is performed without using an internal standard, isotope label or other chemical calibrant.

37. A program storage device accessible by a processor, tangibly embodying a program of instructions executable by said processor to perform method steps for a spectral data processing method, said method steps comprising:

a) obtaining a set of spectra from a plurality of chemical samples, each spectrum comprising peaks having peak intensities; and b) in each spectrum, scaling said peak intensities by a normalization factor computed in dependence on chemical sample components whose concentrations are substantially constant in said chemical samples.

38. The program storage device of claim 37, wherein said chemical sample components whose concentrations are substantially constant are not predetermined.

39. The program storage device of claim 37, wherein said chemical sample components whose concentrations are substantially constant are inherent components of said chemical samples.

40. The program storage device of claim 37, wherein said method steps further comprise, based on said scaled peak intensities, estimating relative concentrations in said samples of a particular sample component corresponding to a particular peak.

41. The program storage device of claim 37, wherein said spectra are mass spectra.

42. The program storage device of claim 41, wherein said mass spectra are produced in part by electrospray ionization of said chemical samples.

43. The program storage device of claim 41, wherein said mass spectra are produced in part by electron-impact ionization of said chemical samples.

44. The program storage device of claim 41, wherein said mass spectra are produced in part by matrix-assisted laser desorption/ionization of said chemical samples.

45. The program storage device of claim 37, wherein said normalization factor is computed from ratios of peak intensities in first and second spectra in said set of spectra.

46. The program storage device of claim 37, wherein said normalization factor is a non-parametric measure of said peak intensities.

47. The program storage device of claim 46, wherein said normalization factor is a median of said peak intensities.

48. The program storage device of claim 37, wherein said chemical samples are biological samples.

49. The program storage device of claim 48, wherein said chemical sample components comprise components selected from the group consisting of metabolites, peptides and proteins.

50. The method of claim 37, wherein said method is performed without using an internal standard, isotope label or other chemical calibrant.

51. A computer readable medium storing a plurality of normalized peak intensities computed by:

obtaining a set of spectra from a plurality of chemical samples, each spectrum comprising peaks having peak intensities; and in each spectrum, scaling said peak intensities by a normalization factor computed in dependence on chemical sample components whose concentrations are substantially constant in said chemical samples.

* * * * *